US011592051B1

United States Patent
Oliphant et al.

(10) Patent No.: US 11,592,051 B1
(45) Date of Patent: Feb. 28, 2023

(54) BOLT EXTENDER ARRANGEMENT

(71) Applicant: Exo Group LLC, Magnolia, TX (US)

(72) Inventors: Wesley J Oliphant, Tomball, TX (US); Zachary James Oliphant, The Woodlands, TX (US); Garett William Oliphant, Spring, TX (US)

( * ) Notice: Subject to any disclaimer, the term of this patent is extended or adjusted under 35 U.S.C. 154(b) by 301 days.

(21) Appl. No.: 16/699,877

(22) Filed: Dec. 2, 2019

(51) Int. Cl.
*F16B 35/04* (2006.01)

(52) U.S. Cl.
CPC .................................... *F16B 35/04* (2013.01)

(58) Field of Classification Search
CPC .......... F16B 5/025; F16B 35/00; F16B 35/04; F16B 35/06; F22B 7/16
USPC ........................ 411/378, 379, 381, 382, 401; 52/294–297
See application file for complete search history.

(56) References Cited

U.S. PATENT DOCUMENTS

| | | | | |
|---|---|---|---|---|
| 1,710,390 A * | 4/1929 | Vodicka | ................ | F16B 37/122 411/378 |
| 3,563,131 A * | 2/1971 | Ridley, Sr. | .............. | F16B 35/04 411/384 |
| 4,162,596 A * | 7/1979 | Damman | .............. | E04B 1/4164 248/634 |
| 6,116,942 A * | 9/2000 | Chen | ....................... | F16B 35/02 411/271 |
| 6,318,924 B1* | 11/2001 | Schiavo, Jr. | ............. | F16B 35/04 403/299 |
| 2006/0016140 A1* | 1/2006 | Smith | ..................... | E02D 27/02 52/295 |
| 2006/0198717 A1* | 9/2006 | Fuest | ..................... | F16B 35/06 411/401 |
| 2015/0078860 A1* | 3/2015 | Ellingson | ................ | F16B 33/02 411/368 |
| 2015/0259913 A1* | 9/2015 | Tanaka | .................... | E02D 27/42 52/296 |

* cited by examiner

*Primary Examiner* — Roberta S Delisle
(74) *Attorney, Agent, or Firm* — Duncan Galloway Greenwald PLLC; Kevin T. Duncan

(57) ABSTRACT

A bolt extender includes a bottom portion defining internal threads and a multi-sided outer surface, an upper shoulder, and a threaded rod projecting upwardly from said upper shoulder.

2 Claims, 6 Drawing Sheets

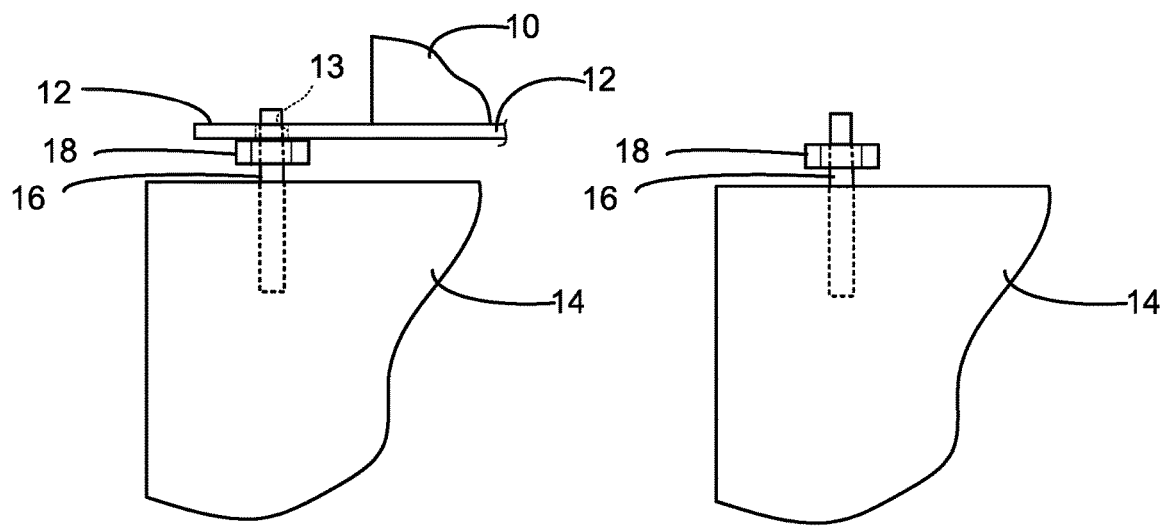
Fig 3                                              Fig 4
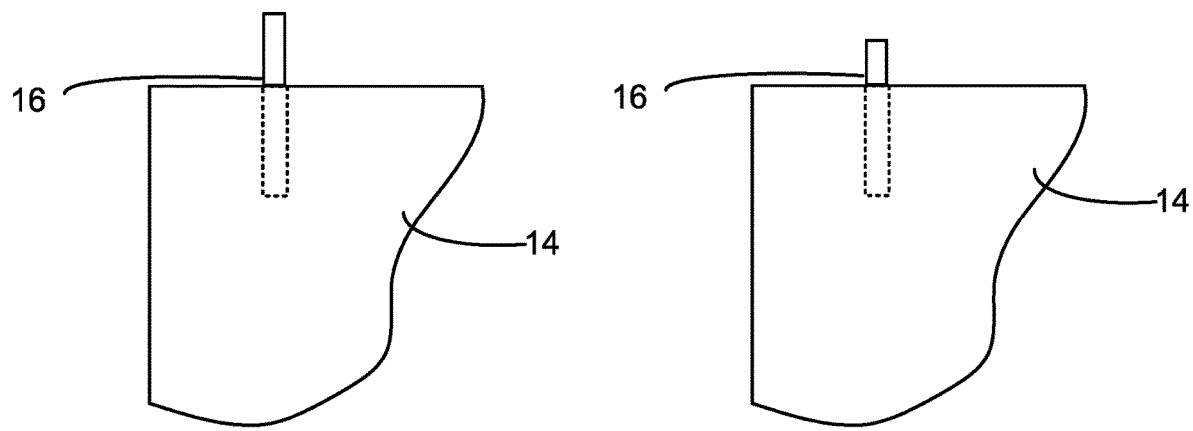
Fig 5
Fig 6

BOLT EXTENDER ARRANGEMENT

BACKGROUND

The present invention relates to a bolt extender arrangement for correcting a faulty bolted foundation. Products such as poles often are secured relative to the ground by bolting them to a concrete foundation embedded in the ground. Threaded rods are embedded in the concrete foundation and project upwardly above the foundation. The product has a flange at its base, with holes in the flange that receive the threaded rods. Nuts are threaded onto the threaded rods to secure the flange on the concrete foundation. In order for the pole or other product to be properly secured, and the full strength of the threaded rod achieved, the nuts should be fully threaded onto the rods so there is full engagement of the threads by the nuts. Sometimes, the threaded rods do not project far enough out of the foundation to permit full engagement between the nuts and the threaded rods. When this occurs, the expected strength of the connection of the base flange to the threaded rods is compromised.

SUMMARY

An embodiment of the present invention provides a bolt extender arrangement in which a longitudinal fitting with a first, hollow, internally-threaded end and a second, solid, externally threaded end, and a shoulder at the transition between the first end second ends is used to repair the bolted foundation when the end of one or more of the threaded rods does not extend far enough out of the foundation to permit full engagement of the threads by the nut.

BRIEF DESCRIPTION OF THE DRAWINGS

FIG. 3 is a view similar to FIG. 2, but with the tightening nut removed, in preparation for correcting the issue of the short, threaded rod;

FIG. 4 is a view similar to FIG. 3, with the flanged pole removed, in the next step for correcting the issue with the short, threaded rod;

FIG. 5 is a view similar to FIG. 4, with leveling nut removed, in the next step for correcting the issue of the short, threaded rod;

FIG. 6 is a view similar to FIG. 5, with the protruding portion of the short, threaded rod cut to a predetermined length, in the next step for correcting the issue of the short, threaded, rod;

DESCRIPTION

Figure 1:
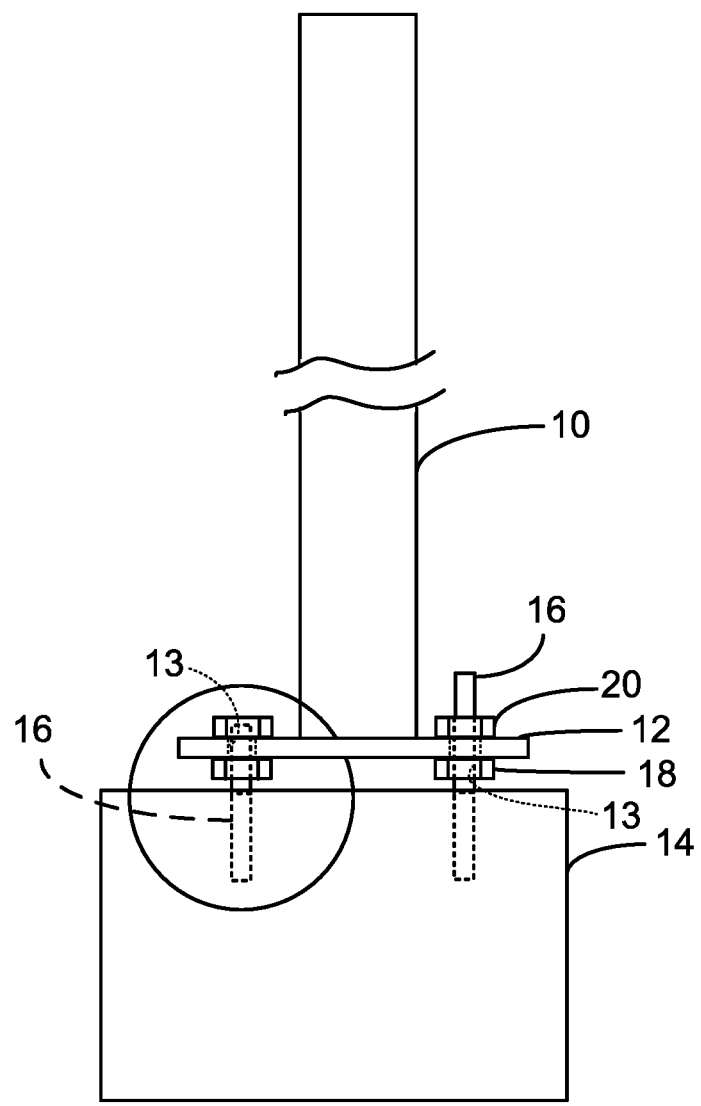
FIG. 1 is a partially broken away, side view of prior art pole which has been secured to a concrete foundation using four rods partially buried in the concrete foundation, with each rod having a leveling nut (to ensure the pole is properly vertically aligned) and a tightening nut to lock down the pole's flange and secure the pole.

FIG. 1 shows a prior art pole 10 with a flanged base 12 mounted on a concrete foundation 14 via four evenly-spaced, threaded rods 16 which are embedded in the concrete foundation 14 and project upwardly out of the foundation 14. Only two of the rods 16 are shown, but the other two rods 16 are directly behind those rods 16. Each of the threaded rods 16 extends through an opening 13 in the flanged base 12. The threaded rods 16 may have a bolt head embedded in the concrete foundation 14, or there may be no bolt head. There may be a different number of threaded rods 16, depending upon the installation. The flanged base 12 typically is welded to the upright pole 10. Each threaded rod 16 has a leveling nut 18, located between the concrete foundation 14 and the bottom surface of the mounting flange 12, and a tightening nut 20 located above the top surface of the mounting flange 12, so the flange 12 is sandwiched in between the leveling nut 18 and the tightening nut 20.

In a typical installation, the threaded rods 16 are buried in the concrete foundation with a portion of the threaded rod 16 projecting far enough above the foundation 14 to enable the installation of the leveling nut 18, the mounting flange 12, and the tightening nut 20 on the projecting portion of the rod 16.

The leveling nuts 18 are all threaded onto their respective threaded rods 16 until the top surface of each leveling nut 18 is at the required height to ensure that the mounting flange 12 will be horizontal and the pole 10 will be vertical. Once the leveling nuts 18 are installed, there needs to be enough remaining threaded rod 16 to mount the flange 12 and the tightening nut 20 with full engagement of the threads of the tightening nut 20 on its respective threaded rod 16.

Figure 2:
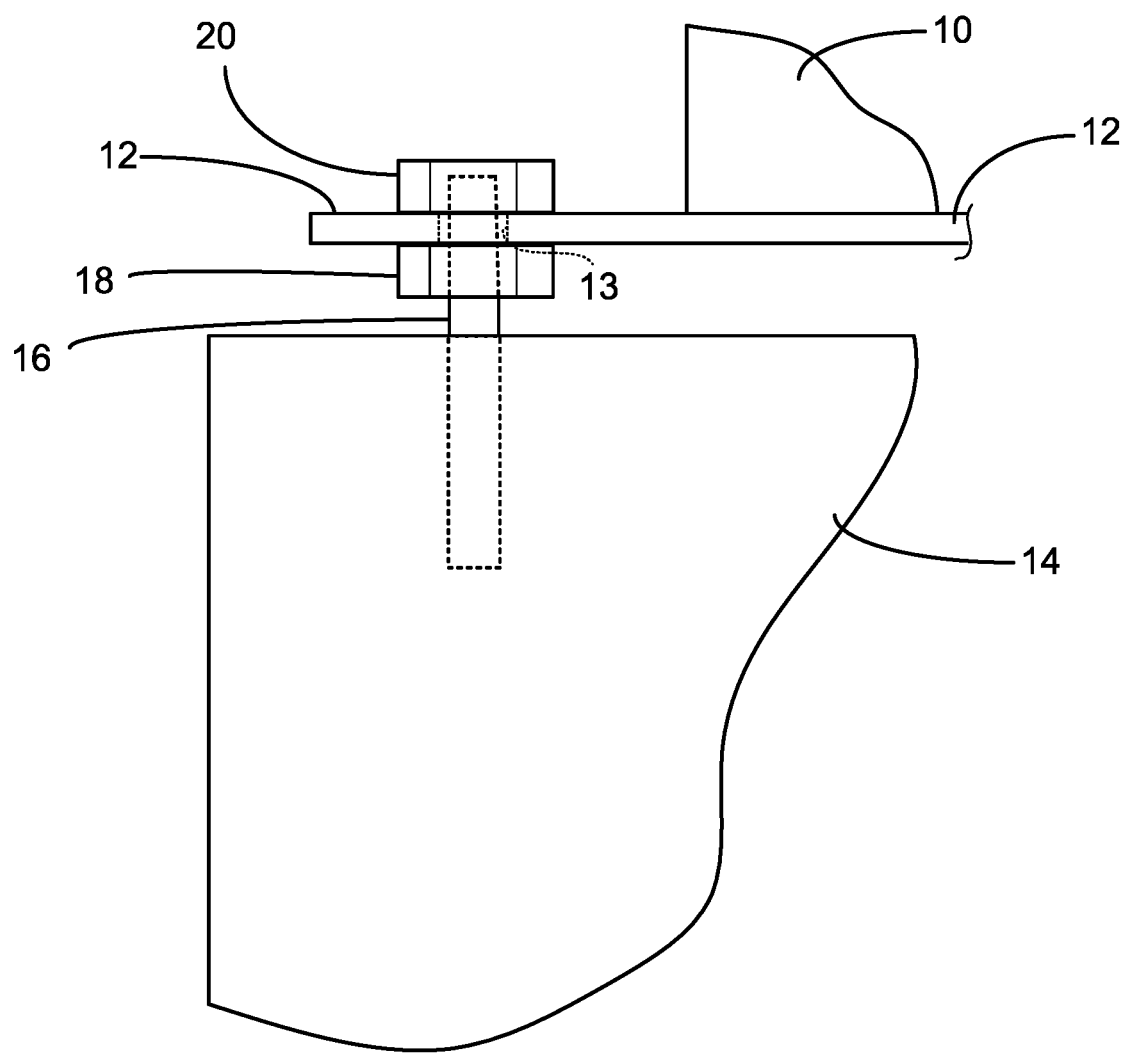
FIG. 2 is an enlarged, close-up view of one of the bolt arrangements of FIG. 1, showing that the threaded rod is too short for full engagement of the threads of the tightening nut.

Sometimes, the projecting portion of the threaded foundation rod 16 is too short to permit full engagement of the tightening nut 20. FIGS. 1 and 2 show a case in which one of the threaded foundation rods 16 is too short. This may occur, for instance, if the installer is overzealous in burying the threaded rods 16 in the foundation 14, or if the foundation is at a slight decline, which necessitates a longer threaded projection of some of the rods 16 to accommodate a longer adjustment to ensure a plumb installation of the pole 10.

FIGS. 3-6 show the steps in preparing for correcting the issue of the threaded rod 16 which is too short for full engagement of the threads of the tightening nut 20. The first step, shown in FIG. 3, is to remove the tightening nut 20. (Although the other foundation rods 16 are not shown, it is understood that all the tightening nuts 20 are removed from all the foundation rods.) Next, as shown in FIG. 4, the pole 10 with its flanged base 12 is removed. Then, as shown in FIG. 5, the leveling nut 18 is removed from the too-short foundation rod 16. The other leveling nuts 18 are left on the other foundation rods 16. Finally, as shown in FIG. 6, the projecting portion of the too-short threaded foundation rod 16 is cut to a predetermined level, if necessary. In this particular embodiment, the exposed portion of the too-short threaded foundation rod 16 is cut to a length of 2 inches from the top of the foundation 14.

Figure 7:
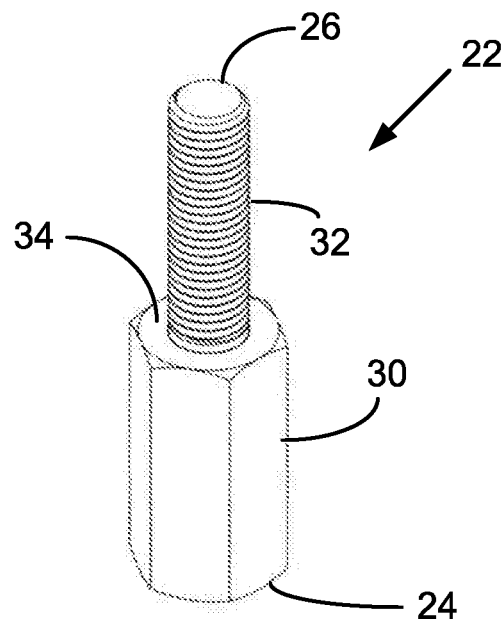
FIG. 7 is a perspective view of a bolt extender which is used to correct the issue of the short, threaded rod.
Figure 8:
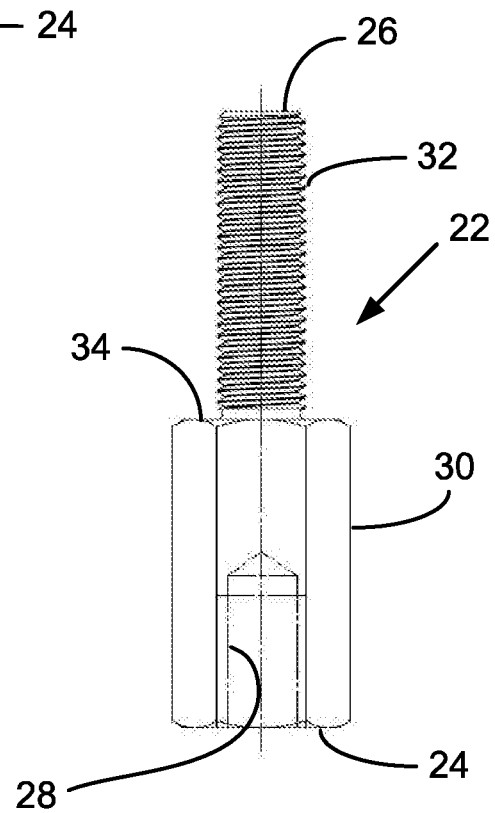
FIG. 8 is a side view of the bolt extender of FIG. 7.

FIGS. 7 and 8 show a bolt extender 22, which is used to correct the problem of the too-short threaded foundation rod 16. The bolt extender 22 is an elongated member having a bottom end 24 and a top end 26. The bottom portion of the bolt extender 22, extending from the bottom end 24, defines a hollow cylindrical internal surface 28 with internal threads. The bottom portion also has a multisided external surface 30, which, in this case, is hexagonal. The multisided external surface 30 continues to an upper shoulder 34. Extending from the top of the upper shoulder 34 is an elongated, solid rod 32 having external threads. The threaded internal surface 28 and the threaded outer surface of the rod 32 are coaxial. In a preferred embodiment, the thread size and pitch of the threaded outer surface portion 32 matches that of the internally threaded surface 28 (which also matches that of the threaded foundation rod 16).

The shoulder 34 acts as the leveling nut for the corrected installation, as described in more detail below.

Figure 9:
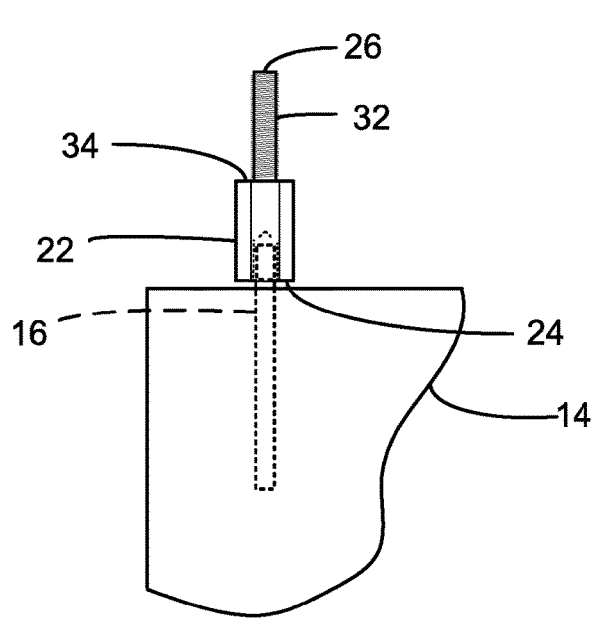
FIG. 9 is a view similar to FIG. 6, but with the bolt extender of FIGS. 7 and 8 installed, in the next step for correcting the issue of the short, threaded rod.
Figure 10:
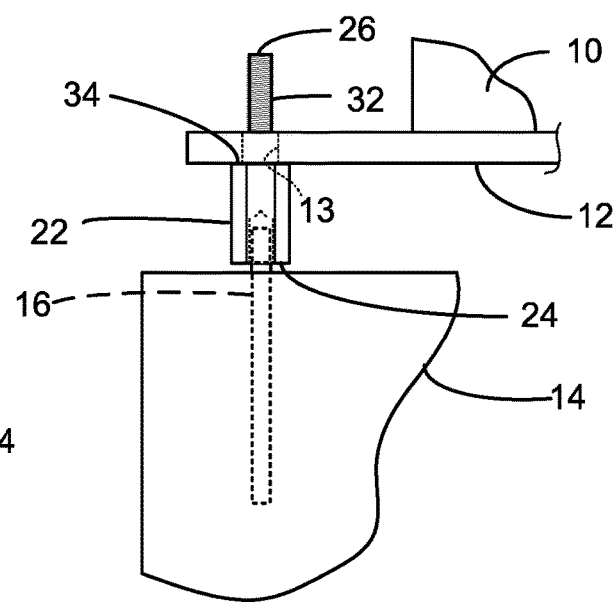
FIG. 10 is a view similar to FIG. 9, with the flanged pole reinstalled, in the next step for correcting the issue of the short, threaded rod.
Figure 11:
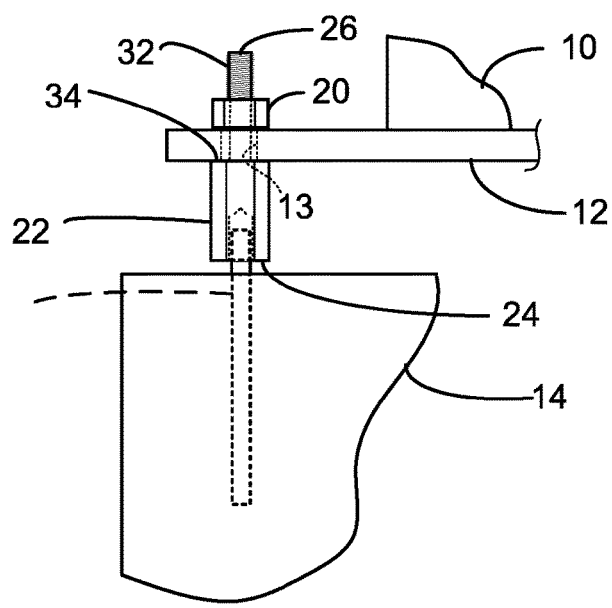
FIG. 11 is a view similar to FIG. 10, with the tightening nut reinstalled, in the last step for correcting the issue of the short, threaded rod.

FIGS. 9-11 describe the steps in reassembling the pole 10 to the foundation 14 using the bolt extender 22 to correct the issue of the threaded rod which is too short. (It is understood that there may be more than one threaded foundation rod that is too short, in which case, a bolt extender 22 will be used on each of the too-short threaded foundation rods.)

In FIG. 9, the bolt extender 22 of FIGS. 7 and 8 has been partially threaded onto the threaded foundation rod 16 so that the shoulder 34 of the bolt extender 22 is at the correct elevation to ensure that the flange 12 will be horizontal and the pole 10 will be vertical upon final installation. The leveling nuts 18 that were on the other threaded foundation rods 16 remain on those rods 16 to ensure the proper vertical alignment of the pole 10. It may be advantageous to provide a flat plate (not shown) during installation, to temporarily replace the pole 10 and flange 12 for the purpose of checking that the leveling nuts 18 are properly threaded into their respective rods 16 to ensure that the flat plate is horizontally oriented (thus ensuring that the pole will be vertically oriented once installed) and that the bolt extender 22 and the leveling nuts 18 are sufficiently threaded over their respective rods 16 to provide ample remaining threads for full engagement of the threads of the tightening nuts 20.

Should any of the rods 16 prove to be too short for full engagement of the threads of its respective tightening nut 20, the bolt extender 22 may be threaded farther down onto its rod 16 to lower the elevation of its shoulder 34, and all the other leveling nuts 18 would then also be threaded farther down their respective rods 16 until all rods 16 provide full engagement of the threads of the tightening nuts 20.

Should any of the rods 16 still prove to be too short for full engagement of the threads of its respective tightening nut 20, the rod(s) 16 which is still too short may be corrected using the technique described above, adding a bolt extender 22 to the rod(s) which is too short to correct the issue with the short, threaded rod.

Figure 12:
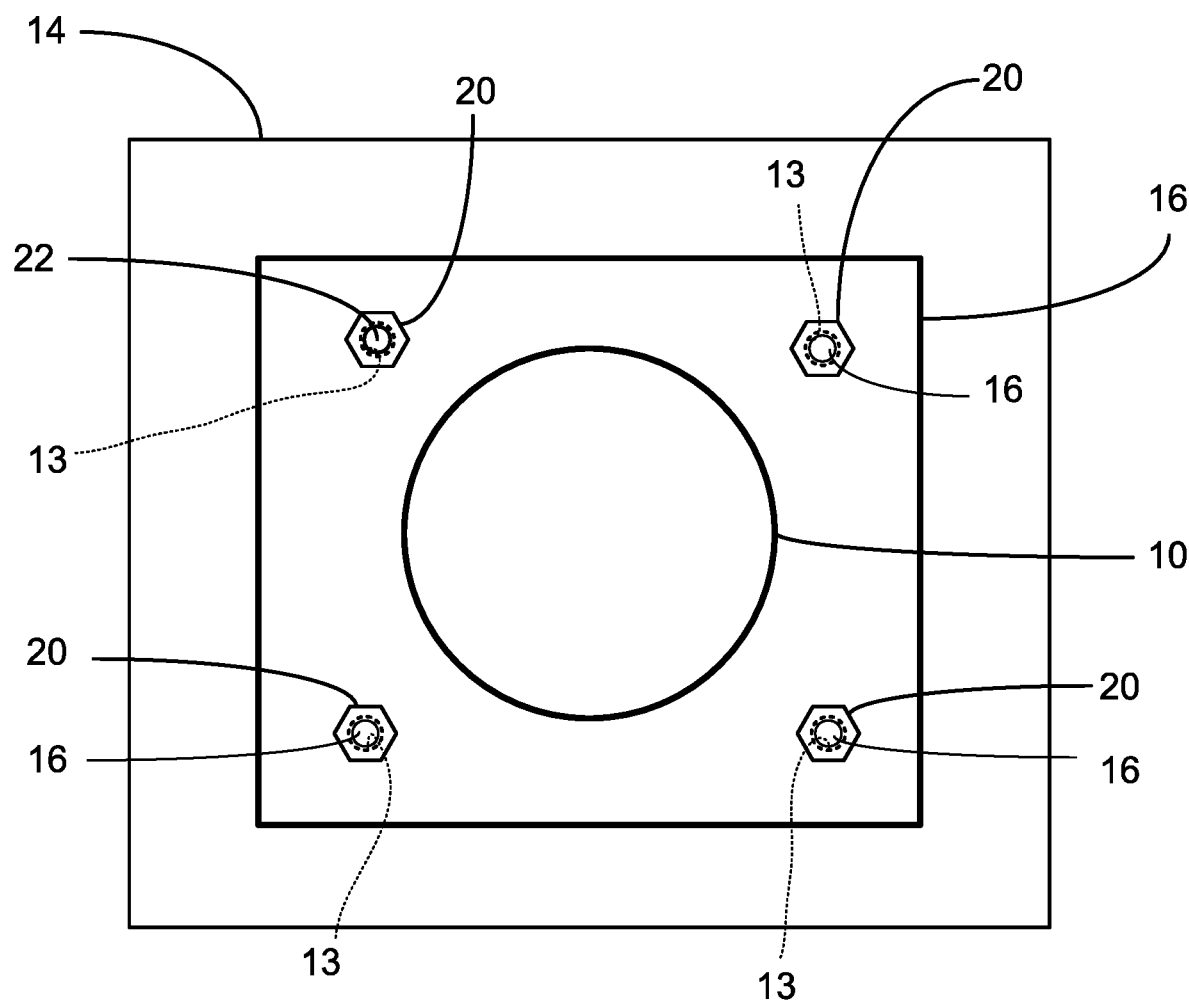
FIG. 12 is a plan view of the pole of FIG. 11, with the top, leftmost rod having been partially replaced and elongated by the bolt extender of FIGS. 7 and 8.

Once the leveling nuts 18 are properly threaded onto their respective rods 16 so that the tops of these leveling nuts 18 are at the same elevation as the shoulder 34 on the bolt extender 22, the pole 10 with its flanged base 12 is mounted so that the flanged base 12 rests atop the shoulder 34 and atop the leveling nuts 18, as shown in FIG. 10. After confirming that the pole 10 is vertically aligned, the tightening nuts 20 are threaded onto their corresponding rods 16 or bolt extender 22, as shown in FIGS. 11 and 12. Once more, the installation is checked to make sure the pole 10 is vertically aligned and that there is full engagement of the threads on all the tightening nuts 20.

It will be obvious to those skilled in the art that modifications may be made to the embodiment described above without departing from the scope of the invention as claimed.

What is claimed is:

1. A bolt extender arrangement for correcting a problem when a threaded foundation rod projecting from a concrete foundation is too short, comprising:
   an elongated bolt extender member having: a bottom portion defining a hollow cylindrical internal surface with internal threads and a multi-sided external surface, said bottom portion also defining an upper shoulder; and an elongated extender rod projecting upwardly from said bottom portion, said extender rod defining external threads, wherein said internal threads and said external threads are coaxial;
   a multi-sided tightening member defining a hollow interior with internal tightening threads configured to mate with said external threads;
   wherein said bolt extender member is adapted to be installed on a threaded foundation rod having receiving threads projecting from a concrete foundation by threading said internal threads of said bolt extender member on the receiving threads of the foundation rod;
   wherein, when installed on the foundation rod, said bolt extender member is adapted to support a flanged base defining an opening configured to permit said extender rod to pass therethrough but prevent the bottom portion from passing through with the flanged base resting on the upper shoulder; and
   wherein said tightening member is secured on said extender rod by threading said internal tightening threads onto said external threads to thereby secure the flanged base on said bolt extender member.

2. A bolt extender arrangement as recited in claim 1, wherein the internal threads and the external threads of the bolt extender member have the same thread size and pitch.

* * * * *